(12) United States Patent
Utsumi et al.

(10) Patent No.: US 8,698,363 B2
(45) Date of Patent: Apr. 15, 2014

(54) ELECTRIC ROTATING MACHINE FOR VEHICLE

(75) Inventors: Yoshinobu Utsumi, Chiyoda-ku (JP); Hideki Morikaku, Chiyoda-ku (JP); Yoshihito Asao, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1131 days.

(21) Appl. No.: 12/117,075

(22) Filed: May 8, 2008

(65) Prior Publication Data

US 2008/0284288 A1     Nov. 20, 2008

Related U.S. Application Data

(62) Division of application No. 10/665,115, filed on Sep. 22, 2003, now abandoned.

(30) Foreign Application Priority Data

Nov. 7, 2002  (JP) ................................ 2002-323677

(51) Int. Cl.
*H02K 11/00*     (2006.01)

(52) U.S. Cl.
USPC ....................................................... 310/68 B

(58) Field of Classification Search
USPC .................................. 310/68 B, 112; 29/598
See application file for complete search history.

(56) References Cited

U.S. PATENT DOCUMENTS

| | | | |
|---|---|---|---|
| 4,067,101 A * | 1/1978 | Ono ................................. | 29/598 |
| 4,363,631 A | 12/1982 | Wloka | |
| 6,377,005 B1 * | 4/2002 | Zintler et al. ..................... | 318/9 |

FOREIGN PATENT DOCUMENTS

| | | |
|---|---|---|
| EP | 0 021 030 A1 | 5/1980 |
| EP | 863383 A1 | 9/1998 |
| EP | 0 731 552 B1 | 1/2000 |
| EP | 1 482 625 A1 | 12/2004 |
| JP | 1-171563 U | 12/1989 |
| JP | 03-296617 A | 12/1991 |
| JP | 09-065617 A | 3/1997 |
| JP | 2001-191931 A | 7/2001 |
| JP | 2001-231218 A | 8/2001 |
| JP | 2002-084724 | 3/2002 |
| JP | 2002-171723 A | 6/2002 |
| JP | 2002168652 A | 6/2002 |
| JP | 2003-155351 A | 5/2003 |
| JP | 2004-157056 A | 6/2004 |
| JP | 2004-159449 A | 6/2004 |

OTHER PUBLICATIONS

PTO 2009-6446. English Translation of Japanese Utility Model Publication No. H1-171563. Jul. 20, 2009.*
German Patent Office, "Office Action," issued in connection with German Patent Application No. 103 48 347.0, dated Jan. 20, 2012.

* cited by examiner

*Primary Examiner* — Terrance Kenerly
*Assistant Examiner* — David Scheuermann
(74) *Attorney, Agent, or Firm* — Sughrue Mion, PLLC

(57) ABSTRACT

An electric rotating machine for a vehicle capable of reducing influence of leakage flux on a turning angle detector as much as possible and detecting a turning angle more accurately is provided. The electric rotating machine for a vehicle includes: a rotor core 12 that is fitted to a rotary shaft 7; a stator core 24 that is concentric with the rotor core 12 and disposed on the outside of the rotor core 12; and a resolver 31 acting as a turning angle detector that is disposed on one shaft end of the rotary shaft 7; in which the rotary shaft 7 itself is constituted to be magnetic flux interrupting means made of a non-magnetic material.

3 Claims, 5 Drawing Sheets

ELECTRIC ROTATING MACHINE FOR VEHICLE

This is a divisional of application Ser. No. 10/665,115 filed Sep. 22, 2003 now abandoned. The entire disclosure of the prior application, application Ser. No. 10/665,115 is hereby incorporated by reference.

BACKGROUND OF THE INVENTION

1. Field of the Invention

The present invention relates to an electric rotating machine for a vehicle having a turning angle detector and, more particularly, to a technology for improving accuracy in detecting turning angle of the turning angle detector.

2. Description of the Related Art

In general, an electric rotating machine for a vehicle is used as a synchronous motor at the time of starting an engine and is also used as an ac generator during stopping the engine. In particular, in the case where the electric rotating machine is used as asynchronous motor at the time of starting the engine and, it is necessary to control timing of applying an electric current to each field coil wound round a stator core and a rotor core. Therefore, hitherto, a turning angle detector is mounted on one shaft end part side of a rotary shaft to which the rotor core is fitted, thereby detecting a turning angle.

In this type of electric rotating machine for a vehicle, in the case of using a magnetic turning angle detector or a resolver as the above-mentioned turning angle detector, the rotary shaft is magnetized by the application of an electric current to the rotor coil wound round the rotor core. As a result of this, it has been often the case that detection accuracy of the turning angle detector is influenced by leakage flux flowing through the rotary shaft.

To overcome this disadvantage, an attempt has been proposed, in which magnetic bypass members of high-permeability are disposed in such a manner as to project outwardly in radial direction holding a magnetic turning angle detector at the front and rear parts thereof along the axial direction. Thus, leakage flux flowing through the rotary shaft is bypassed via the magnetic bypass members, thereby preventing the leakage flux from flowing through a space between Hall element and permanent magnet constituting the turning angle detector. (See the Japanese Patent Publication (unexamined) No. 2002-171723 (pages 1 to 6, FIGS. 1 and 2), for example).

In the construction disclosed in this Japanese Patent Publication (unexamined) No. 2002-171723, the leakage flux flowing through the space between the Hall element and permanent magnet constituting the magnetic turning angle detector is reduced. As a result, it is possible to improve detection accuracy of the turning angle detector to a certain extent.

However, there still is a room for improvement in the construction disclosed in the Japanese Patent Publication (unexamined) No. 2002-171723 as follows:

(1) It is necessary to additionally install the high-permeability magnetic bypass members. Therefore, there is an increase in number of parts eventually resulting in a complicated construction as a whole.

(2) The inner magnetic bypass member near the rotor core side, which is one of the magnetic bypass members disposed in front and rear of the magnetic turning angle detector, is fixed onto a side wall of a housing. Therefore, a gap is formed between the inner magnetic bypass member and the rotary shaft. The outer magnetic bypass member fixed onto an end of the rotary shaft is mounted on a retainer made of a non-magnetic material. As a result, the advantage of bypassing the leakage flux through the magnetic bypass members is not always sufficient, and there is a limit in improving detection accuracy of the turning angle detector.

SUMMARY OF THE INVENTION

The present invention was made to solve the above-discussed problems and has an object of providing an electric rotating machine for a vehicle capable of reducing influence of the leakage flux on the turning angle detector as much as possible and detecting the turning angle more accurately.

To accomplish the foregoing object, an electric rotating machine for a vehicle according to the invention includes: a rotor core that is fitted to a rotary shaft; a stator core that is concentric with the rotor core and disposed on the outside of the rotor core; and a turning angle detector that is disposed at one shaft end of the foregoing rotary shaft. In this electric rotating machine for a vehicle, following features are adopted.

According to a first feature of the invention, the mentioned rotary shaft itself is constituted to be magnetic flux interrupting means made of a non-magnetic material.

According to a second feature of the invention, a portion extending from a mounting part on the rotor side to the shaft end and constituting the turning angle detector of the mentioned rotary shaft is constituted to be shaft-shaped magnetic flux interrupting means made of a non-magnetic material instead of the rotary shaft portion. This magnetic flux interrupting means is integrally formed with the rotary shaft by press fitting or welding.

According to a third feature of the invention, a part of a rotor side member constituting the mentioned turning angle detector is constituted to be magnetic flux interrupting means made of a non-magnetic material.

According to the mentioned features of the invention, the magnetic flux interrupting means is disposed on the way of a magnetic path through which a magnetic field generated by application of an electric current to a rotor coil wound round the mentioned rotor core flows into the turning angle detector. Therefore, leakage flux flowing from the rotary shaft through the turning angle detector is remarkably reduced owing to this magnetic flux interrupting means. As a result, influence of the leakage flux on the turning angle detector is largely reduced, and this improves accuracy in detecting turning angle all the more. Furthermore, since the magnetic flux interrupting means made of a non-magnetic material can be constructed without increase in number of parts as compared with that of the conventional machine, the electric rotating machine for a vehicle is achieved easily at a reasonable cost.

BRIEF DESCRIPTION OF THE DRAWINGS

FIG. 3 (a) shows a longitudinal sectional view of the essential part thereof, and FIG. 3 (b) is a cross-sectional view of a resolver rotor.

DESCRIPTION OF THE PREFERRED EMBODIMENTS

Embodiment 1

Figure 1:
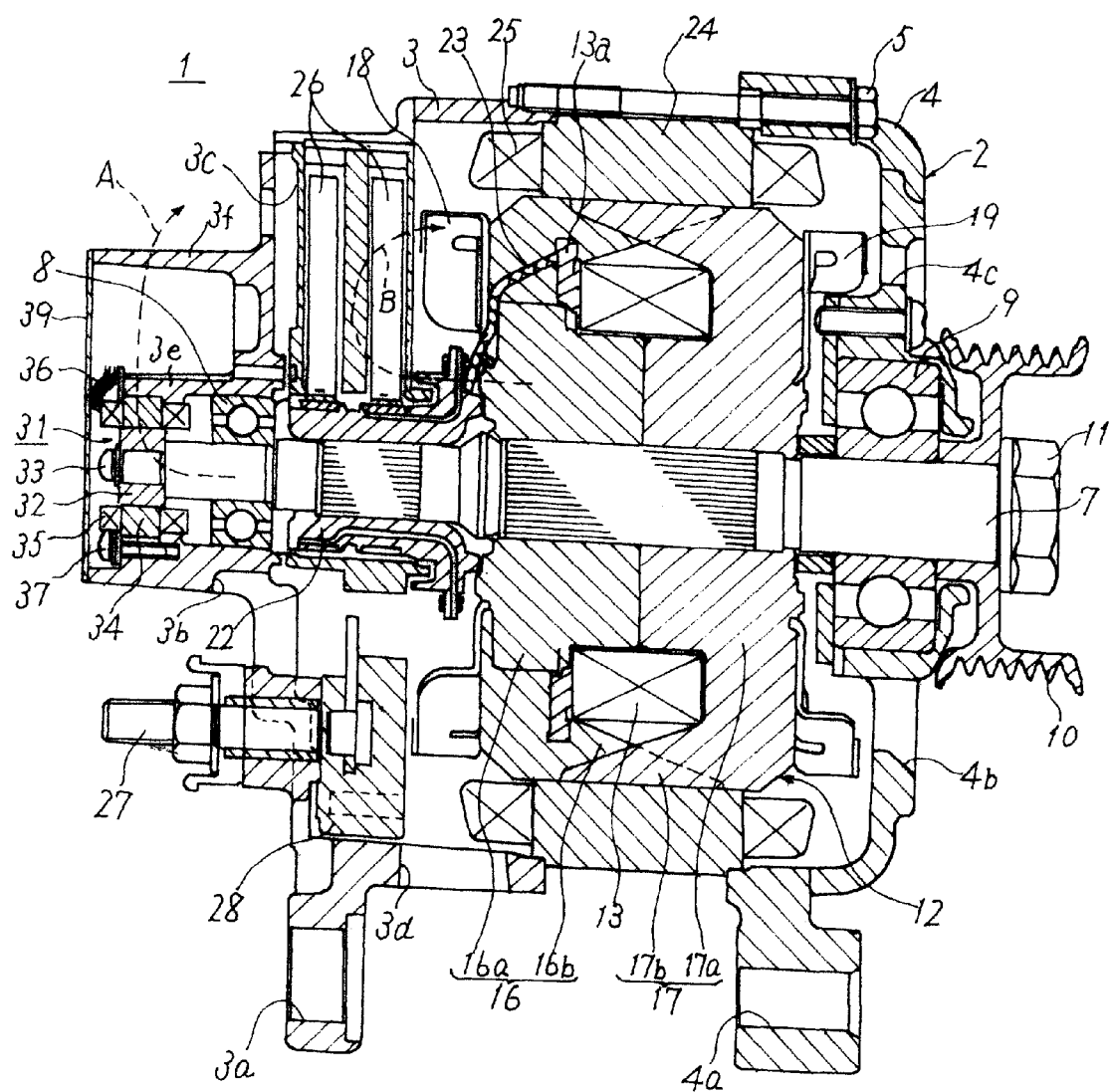
FIG. 1 is a longitudinal sectional view showing a construction of an electric rotating machine for a vehicle according to Embodiment 1 of the present invention.

FIG. 1 is a vertical section showing a construction of an electric rotating machine for a vehicle according to Embodiment 1 of the invention.

In the drawing, reference numeral 1 indicates an entire electric rotating machine for a vehicle, and numeral 2 indicates a housing constituted of a pair of left and right brackets 3 and 4 fixedly joined together with a screw 5. The brackets 3 and 4 are provided with mounting holes 3a and 4a for mounting the brackets on a vehicle body not shown and vent holes 3b, 3c, 3d, 4b and 4c for cooling inside. A cylindrical hood part 3f protrudes from one side of the bracket 3 located on the left side in the drawing, and a sensor mounting part 3e is formed at internal portion of this hood part 3f.

Numeral 7 is a rotary shaft and numerals 8 and 9 are bearings rotatably supporting the rotary shaft 7 on the housing 2, and these bearings 8 and 9 are separately mounted on the brackets 3 and 4. Numeral 10 is a pulley around which a timing belt not shown is wrapped, and numeral 11 is a nut for fixing the pulley 10 onto the rotary shaft 7. Numeral 12 is a rotor core fitted to the rotary shaft 7, and numeral 13 is a rotor coil wound round the rotor core 12.

The rotor core 12 is constituted of a pair of left and right core members 16 and 17 integrally formed into one unit. The core members 16 and 17 are provided with claw pole parts 16b and 17b extending from cylindrical parts 16a and 17a, where a bobbin 13a round which the rotor coil 13 is wound is accommodated, to a positions where the claw pole parts 16b and 17b cover the rotor coil 13 and cross each other. Accordingly, the left and right claw pole parts 16b and 17b of constant pitch are alternately disposed along the circumferential direction at predetermined intervals. Numerals 18 and 19 are cooling fans mounted on outer faces of the core members 16 and 17.

Numeral 22 is a slip ring fitted to the rotary shaft 7, and this slip ring 22 is electrically connected to the rotor coil 13 via electric cable 23. Accordingly, when a field current flows through the rotor coil 13, the claw pole parts 16b and 17b of the core members 16 and 17 constituting the rotor core 12 are magnetized so that the claw pole parts 16b and 17b are alternately changed between plus and minus polarity along the circumferential direction.

Numeral 24 is a stator core disposed on the outside of the rotor core 12 concentrically therewith, and the stator core 24 is fixed to the housing 2. Numeral 25 is a stator coil wound round the stator core 24, and numeral 26 is a brush being in contact with the slip ring 22. Numeral 27 is a terminal block for connection to a three-phase inverter circuit not shown, and numeral 28 is a wiring board. The terminal block 27 is electrically connected to the stator coil 25 via the wiring board 28 and electric cable not shown. The mentioned construction itself is publicly known, and therefore further detailed description thereof is omitted herein.

A resolver 31 acting as a turning angle detector is disposed at a shaft end part opposite to the portion, where the pulley 10 is mounted, of the mentioned rotary shaft 7. This resolver 31 is constructed by fixing a resolver rotor 32 to the shaft end part of the rotary shaft 7 with a screw 33, fixing a resolver stator 34 onto an inner circumferential part of the sensor mounting part 3e of the bracket 3, which is one of the brackets 3 and 4, with a screw 37, and winding a resolver coil 35 round this resolver stator 34. Although construction of the resolver 31 described above is relatively simple, the resolver 31 is hardly influenced by mechanical vibration, etc. and has an advantage of being capable of accurately detecting a turning angle. In addition, numeral 36 is electric cable for input/output of signal connected to the resolver coil 35, and numeral 39 is a protective cover mounted on an opening end face of the hood part 3f of the bracket 3.

This Embodiment 1 is characterized in that the magnetic flux interrupting means is disposed on the way of a magnetic path through which a magnetic field generated by application of an electric current to a rotor coil 13 wound round the mentioned rotor core 12 flows into the resolver 31. In particular, according to this Embodiment 1, the mentioned rotary shaft 7 itself is composed of a non-magnetic material to acts also as the magnetic flux interrupting means. In this embodiment, the non-magnetic material the rotary shaft 7 is composed of an austenitic stainless steel. It is also preferable to use any other non-magnetic material instead of the mentioned austenitic stainless steel.

If the rotary shaft 7 is made of a magnetic material such as steel, the rotary shaft 7 is magnetized by application of an electric current to the rotor coil 13 and, consequently, the leakage flux flowing through the rotary shaft 7 flows from the resolver rotor 32 into the resolver stator 34 as indicated by A in FIG. 1, which results in poor accuracy in detecting turning angle of the resolver 31.

On the other hand, in this Embodiment 1, the rotary shaft 7 itself is composed of a non-magnetic material. Therefore, even if a current is applied to the rotor coil 13, the rotary shaft 7 is not magnetized and the leakage flux flows through the path indicated by B in FIG. 1. Thus the leakage flux flowing from the resolver rotor 32 into the resolver stator 34 is remarkably reduced. As a result, the influence of the leakage flux on the resolver 31 is largely reduced, making it possible to accurately detect the turning angle. Furthermore, since the rotary shaft 7 itself acts as the magnetic flux interrupting means, number of parts is not increased, and the electric rotating machine for a vehicle is formed into an extremely simple construction.

Embodiment 2

Figure 2:
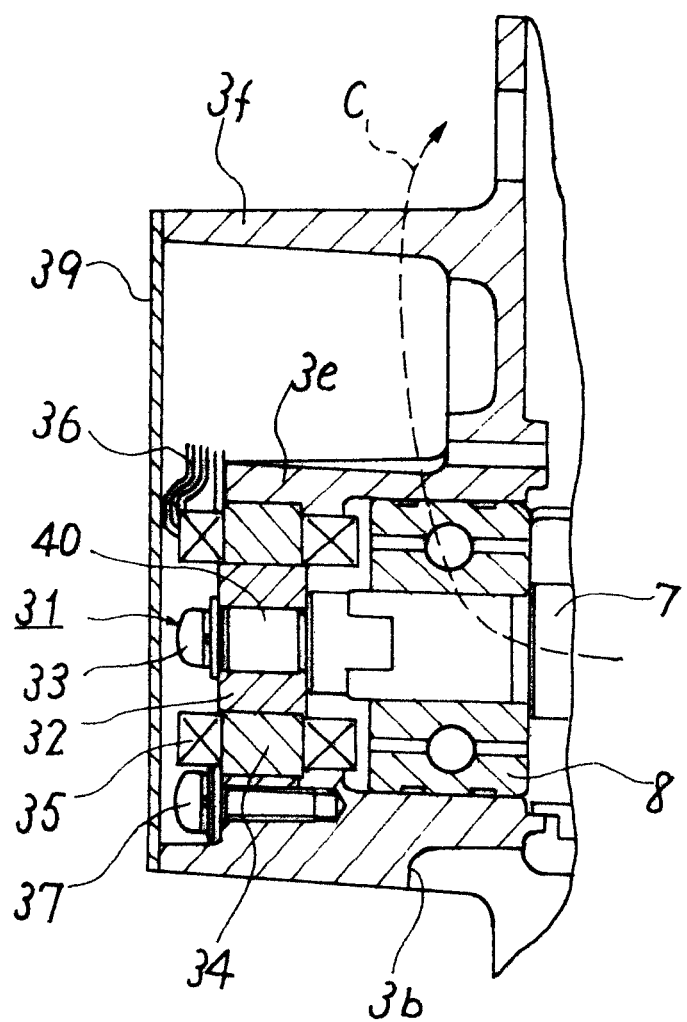
FIG. 2 is a longitudinal sectional view showing an essential part of an electric rotating machine for a vehicle according to Embodiment 2 of the invention.

FIG. 2 is a longitudinal sectional view showing an essential part of an electric rotating machine for a vehicle according to Embodiment 2 of the invention. The same numerals are designated to the parts identical or equivalent to those in the foregoing construction shown in FIG. 1.

The electric rotating machine for a vehicle according to this Embodiment 2 is characterized in that a shaft-shaped member 40 made of a non-magnetic material is employed instead of the rotary shaft 7 at the portion on which the resolver rotor 32 on one end side of the rotary shaft 7 is mounted, and this shaft member 40 acts as magnetic flux interrupting means. A protrusion of this non-magnetic shaft member 40 is fitted into a recess of the rotary shaft 7 thereby the shaft-shaped member 40 and the rotary shaft 7 are integrally formed into one body. They are integrally formed by such a method as press fitting or welding. The resolver rotor 32 is fixed to this shaft member 40 with the screw 33.

In this embodiment, although the mentioned rotary shaft 7 is made of a high-strength member such as steel, the shaft-shaped member 40 and the screw 33 are made of austenitic stainless steel. It is also preferable to use any other non-magnetic material instead of the mentioned austenitic stainless steel.

The rest of the construction according to this embodiment is the same as that in the foregoing Embodiment 1, and further detailed description thereof is omitted herein.

As described above, according to this Embodiment 2, since the shaft member 40, which is integrally fixed to the rotary shaft 7 and acts as a part of the rotary shaft 7, is composed of a non-magnetic material, the leakage flux flowing through the rotary shaft 7 is blocked by the shaft member 40. Therefore, the leakage flux flows as indicated by C in FIG. 2, thus the leakage flux flowing from the resolver rotor 32 into the resolver stator 34 is remarkably reduced. As a result, the influence of the leakage flux on the resolver 31 is largely reduced, making it possible to accurately detect the turning angle.

Since the magnetic flux interrupting means is constructed simply by press fitting or welding the non-magnetic shaft-shaped member 40 to the end of the rotary shaft 7 so that the shaft member 40 and the rotary shaft 7 are joined together, this electric rotating machine for a vehicle can be formed into a simple construction without increase in number of parts. Furthermore, since the rotary shaft 7, on which a load is applied at the time of starting the engine or at the time of generating a power, is composed of a high-strength member such as steel, strength of the rotary shaft 7 is sufficiently secured.

Embodiment 3

Figure 3:
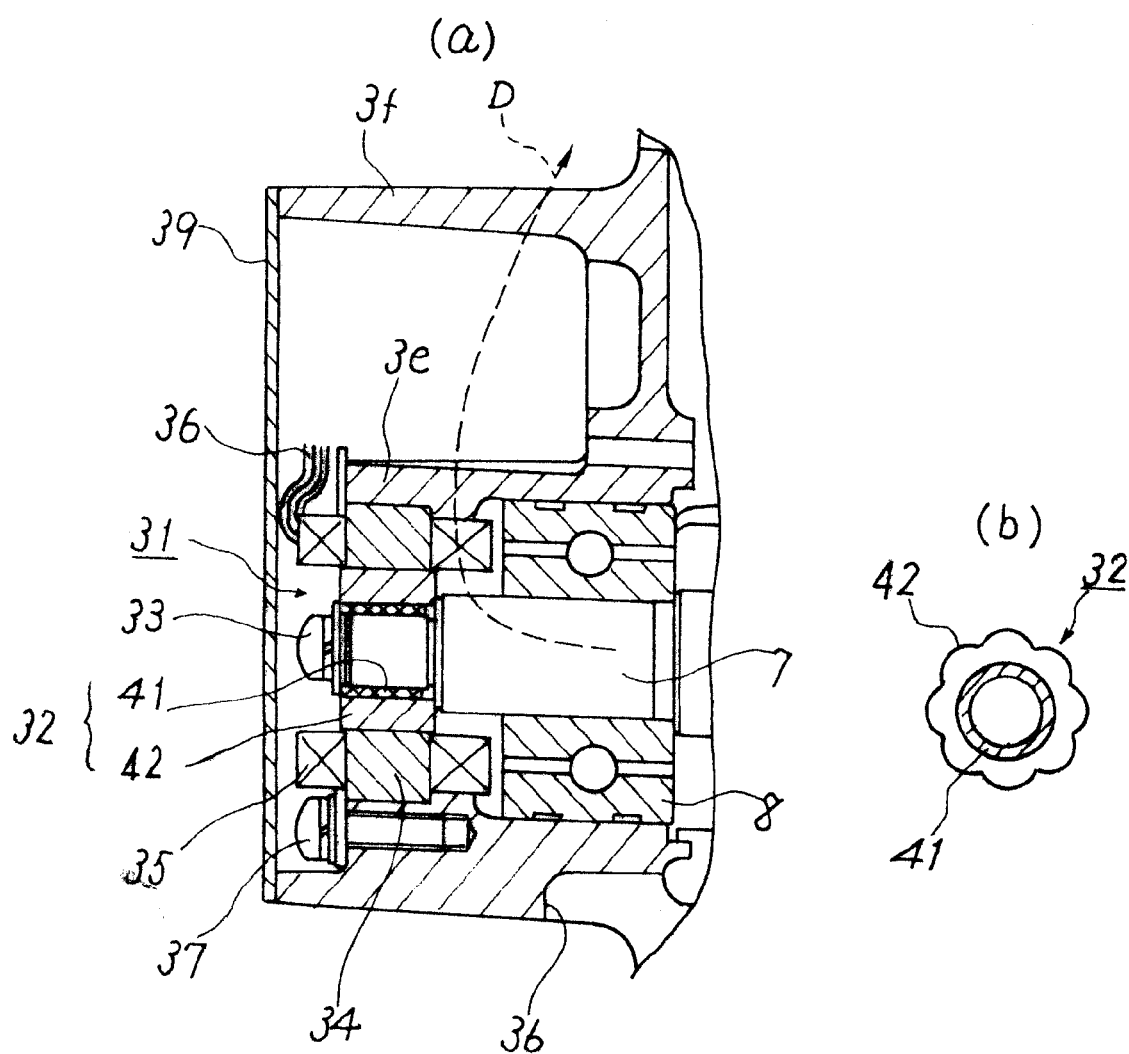
FIGS. 3 (a) and (b) show respectively an essential part of an electric rotating machine for a vehicle according to Embodiment 3 of the invention.

FIG. 3 shows an essential part of an electric rotating machine for a vehicle according to Embodiment 3 of the invention, and in which the same numerals are designated to the parts identical or equivalent to those in the foregoing construction shown in FIG. 1.

The electric rotating machine for a vehicle according to this Embodiment 3 is characterized in that the resolver rotor 32 mounted on the rotary shaft 7 is constituted by fitting a laminated core 42 on a non-magnetic cylindrical body 41, and this cylindrical body 41 acts as magnetic flux interrupting means. The cylindrical body 41 and the laminated core 42 are integrally formed by a method such as press fitting or welding.

In this embodiment, although the rotary shaft 7 is made of a high-strength member such as steel, the mentioned cylindrical body 41 is made of austenitic stainless steel. It is also preferable to use any other non-magnetic material instead of the mentioned austenitic stainless steel.

The rest of the construction is the same as that in the foregoing Embodiment 1, and further detailed description thereof is omitted herein.

As described above, according to this Embodiment 3, since the cylindrical body 41 constituting a part of the resolver rotor 32 is composed of a non-magnetic material, the non-magnetic cylindrical body 41 blocks the leakage flux flowing through the rotary shaft 7. Therefore, the leakage flux flows as indicated by D in FIG. 3 (*a*), and the leakage flux flowing from the resolver rotor 32 into the resolver stator 34 is remarkably reduced. As a result, the influence of the leakage flux on the resolver 31 is largely reduced, making it possible to detect the turning angle more accurately.

Furthermore, since the resolver rotor 32 is constructed simply by fitting the laminated core 42 on the non-magnetic cylindrical body 41, the electric rotating machine for a vehicle can be formed into a simple construction without increase in number of parts. Moreover, since the rotary shaft 7 that is loaded at the time of starting the engine or at the time of generating a power is composed of a high-strength member such as steel, strength of the rotary shaft 7 is sufficiently secured.

Embodiment 4

Figure 4:
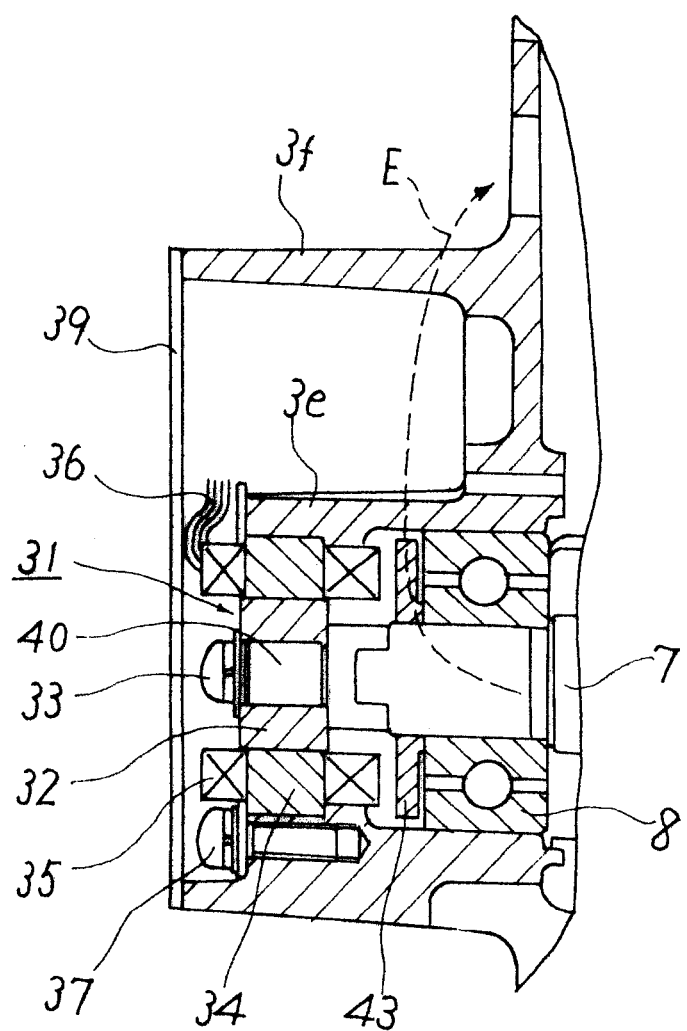
FIG. 4 is a longitudinal sectional view showing an essential part of an electric rotating machine for a vehicle according to Embodiment 4 of the invention.

FIG. 4 is a longitudinal sectional view showing an essential part of an electric rotating machine for a vehicle according to Embodiment 4 of the invention. The same numerals are designated to the parts identical or equivalent to those in the foregoing construction shown in FIG. 1.

The electric rotating machine for a vehicle in this Embodiment 4 is characterized in that the shaft member 40 made of a non-magnetic material is employed instead of the rotary shaft 7 at the portion on one end side of the rotary shaft 7 on which the resolver rotor 32 is mounted, and this shaft member 40 acts as magnetic flux interrupting means. A protrusion of the rotary shaft 7 is fitted into a recess of the non-magnetic shaft member 40, thereby the rotary shaft 7 and the shaft member 40 being integrally formed. They are integrally formed by a method such as press fitting or welding. The resolver rotor 32 is fixed to the shaft member 40 with the screw 33.

In this embodiment, although the foregoing rotary shaft 7 is made of a high-strength member such as steel, the shaft member 40 and the screw 33 are made of austenitic stainless steel. It is also preferable to employ any other non-magnetic material instead of the mentioned austenitic stainless steel.

Furthermore, in this Embodiment 4, a ring-shaped magnetic bypass member 43 made of a high-permeability material such as soft-iron material is fitted on an outer circumferential part of the rotary shaft 7 located between the bearing 8 and the resolver 31 by a method such as press fitting, thereby the magnetic bypass member 43 and the rotary shaft 7 being integrally formed.

The rest of the construction is the same as that in the foregoing Embodiment 1, and further detailed description thereof is omitted herein.

As described above, according to this Embodiment 4, since the magnetic bypass member 43 integrally formed with the rotary shaft 7 is disposed between the rotor core 12 and the resolver 31, most of the leakage flux flowing through the rotary shaft 7 flows through this magnetic bypass member 43 toward the outside in the diametral direction and into the stator core 24 as indicated by E in FIG. 4.

Even if a part of the leakage flux flowing through the rotary shaft 7 flows toward the resolver 31, since the shaft member 40 at the portion on which the resolver rotor 32 is mounted is composed of a non-magnetic material, the leakage flux is blocked by the shaft member 40.

As a result, the leakage flux flowing from the resolver rotor 32 into the resolver stator 34 is remarkably reduced, and the influence of the leakage flux on the resolver 31 is largely reduced, which further improves accuracy in detecting turning angle as compared with the foregoing Embodiment 2. Furthermore, since the rotary shaft 7 to which a load is applied at the time of starting the engine or at the time of generating a power is composed of a high-strength member such as steel, strength of the rotary shaft 7 is sufficiently secured.

Embodiment 5

Figure 5:
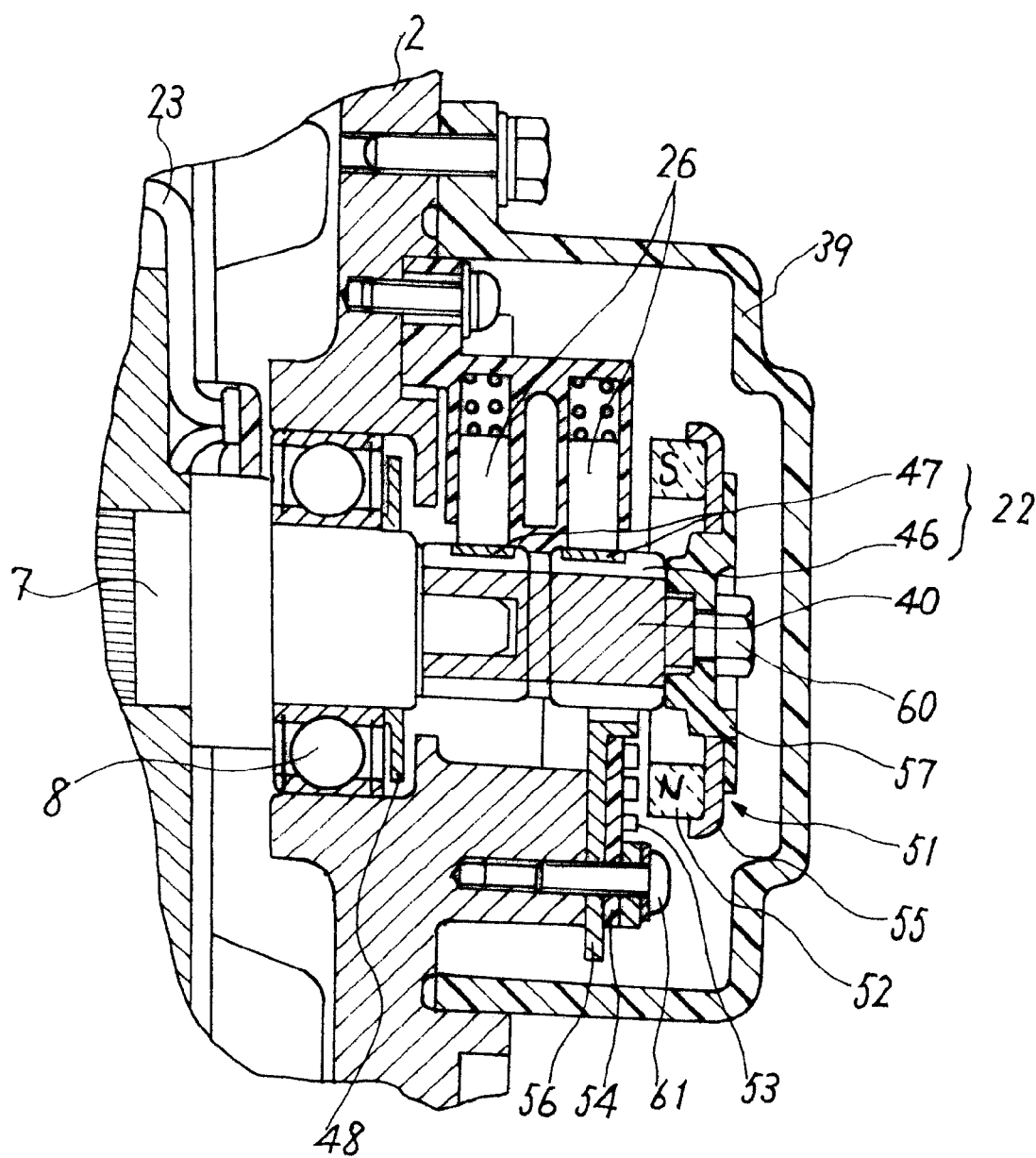
FIG. 5 is a longitudinal sectional view showing an essential part of an electric rotating machine for a vehicle according to Embodiment 5 of the invention.

FIG. 5 is a longitudinal sectional view showing an essential part of an electric rotating machine for a vehicle according to Embodiment 5 of the invention. The same numerals are designated to portions identical or equivalent to those in the construction shown in FIG. 1.

According to the electric rotating machine for a vehicle in this Embodiment 5, a magnetic turning angle detector 51 is disposed at a shaft end part opposite to the portion not shown, where the pulley 10 is mounted, of the mentioned rotary shaft 7 rotatably supported by the bearing 8.

Further, a protrusion is formed on one end side of the foregoing rotary shaft 7, and a recess is formed on the shaft member 40 made of a non-magnetic material. The protrusion of the rotary shaft 7 is press fitted or welded to the recess of the shaft member 40, thereby the rotary shaft 7 and the shaft member 40 are integrally fixed to one another, and this shaft member 40 acts as magnetic flux interrupting means.

In this embodiment, although the rotary shaft 7 is made of a high-strength member such as steel, the shaft member 40 is made of austenitic stainless steel. It is also preferable to employ any other non-magnetic material instead of the mentioned austenitic stainless steel.

A slip ring 22 is fitted on an outer circumference of the shaft member 40. This slip ring 22 is constructed by forming a pair of left and right ring-shaped electrodes 47 on an outer circumference of a cylindrical member 46 made of resin, and a brush 26 is in contact with each electrode 47. The electrodes 47 are electrically connected to the rotor coil via the electric cable 23.

Furthermore, a ring-shaped first bypass member 48 made of a high-permeability material such as soft-iron material is fitted on an outer circumferential part of the rotary shaft 7 between the bearing 8 and the slip ring 22 by a method such as press fitting.

The foregoing magnetic turning angle detector 51 is provided with a permanent magnet 52, Hall element 53, a wiring board 54, second and third magnetic bypass members 55 and 56, and a retainer 57.

The retainer 57 is fixed onto an end part of the mentioned shaft member 40 with a bolt 60, and the ring-shaped second magnetic bypass member 55 is integrally fixed to this retainer 57. Furthermore, the permanent magnet 52 is mounted on this second magnetic bypass member 55. On the other hand, the third bypass member 56 and the distributing circuit board 54 are both fixed to the housing 2 with a screw 61, and the Hall element 53 are mounted on the wiring board 54.

The foregoing second and third magnetic bypass members 55 and 56 are made of a high-permeability material such as soft-iron material, and the retainer 57 is made of a non-magnetic material such as austenitic stainless steel.

As described above, according to this Embodiment 5, since the first magnetic bypass member 48 made of a high-permeability material is integrally fitted on the outer circumferential part of the rotary shaft 7 between the bearing 8 and the slip ring 22, most of the leakage flux flowing through the rotary shaft 7 flows through this first magnetic bypass member 48 toward the outside in the diametral direction and into the stator core 24.

Even if a part of the leakage flux flowing through the rotary shaft 7 flows toward the magnetic turning angle detector 51, since the shaft member 40 is composed of a non-magnetic material, the leakage flux is blocked by the shaft member 40.

Further, if the non-magnetic shaft member 40 cannot block all the leakage flux, the remaining leakage flux flows bypassing through the second and third magnetic bypass members 55 and 56. As a result, the leakage flux flowing from the rotary shaft 7 through a space between the Hall elements 53 and the permanent magnets 52 constituting the turning angle detector 51 is remarkably reduced.

As a result, the influence of the leakage flux on the magnetic turning angle detector 51 is largely reduced, which further improves accuracy in detecting turning angle as compared with the conventional machine. Moreover, the rotary shaft 7 that is loaded at the time of starting the engine or at the time of generating a power is composed of a high-strength member such as steel, strength of the rotary shaft 7 is sufficiently secured.

Simply press fitting or welding the non-magnetic shaft member 40 to the end of the rotary shaft 7 thereby joining together the shaft member 40 and the rotary shaft 7 constitutes the magnetic flux interrupting means. As a result, the electric rotating machine for a vehicle is formed into a simple construction without increase in number of parts.

It is to be understood that the invention is not limited to the construction described in the foregoing Embodiments 1 to 5, and various changes and modifications may be made without departing from the spirit and scope of the invention.

What is claimed is:

1. An electric rotating machine for a vehicle comprising: a rotor core that is fitted to a rotary shaft; a stator core that is concentric with said rotor core and disposed on the outside of said rotor core; and a turning angle detector that is disposed at one shaft end of said rotary shaft;
   wherein a part of a rotor side member constituting said turning angle detector is constituted to be magnetic flux interrupting means made of a non-magnetic material.

2. The electric rotating machine for a vehicle according to claim 1, wherein a high-permeability magnetic bypass member is disposed between said rotor core and said turning angle detector.

3. The electric rotating machine for a vehicle according to claim 1, wherein said turning angle detector is a resolver.

* * * * *